United States Patent
Nativel et al.

(10) Patent No.: US 8,605,044 B2
(45) Date of Patent: Dec. 10, 2013

(54) TRUSTED DISPLAY BASED ON DISPLAY DEVICE EMULATION

(75) Inventors: Dany J. Nativel, ST-Cyr sur Mer (FR); Christophe J. Tremlet, Aubagne (FR)

(73) Assignee: Maxim Integrated Products, Inc., San Jose, CA (US)

( * ) Notice: Subject to any disclaimer, the term of this patent is extended or adjusted under 35 U.S.C. 154(b) by 728 days.

(21) Appl. No.: 12/799,749

(22) Filed: Apr. 29, 2010

(65) Prior Publication Data

US 2011/0199308 A1 Aug. 18, 2011

Related U.S. Application Data

(60) Provisional application No. 61/337,937, filed on Feb. 12, 2010.

(51) Int. Cl.
*G06F 3/041* (2006.01)

(52) U.S. Cl.
USPC ............................. 345/173; 345/156; 345/168

(58) Field of Classification Search
USPC .................................................. 345/156–173
See application file for complete search history.

(56) References Cited

U.S. PATENT DOCUMENTS

| | | | | |
|---|---|---|---|---|
| 5,373,307 A * | 12/1994 | Shiraishi | ........................ | 345/2.2 |
| 2004/0227735 A1* | 11/2004 | Pratt et al. | ..................... | 345/173 |
| 2008/0126810 A1* | 5/2008 | Chiu | ............................. | 713/186 |
| 2008/0167002 A1* | 7/2008 | Kim et al. | ..................... | 455/411 |
| 2009/0119221 A1* | 5/2009 | Weston et al. | .................. | 705/76 |

* cited by examiner

*Primary Examiner* — Viet Pham
(74) *Attorney, Agent, or Firm* — North Weber & Baugh LLP (57) ABSTRACT

An integrated circuit has a keypress entry interface and a pass-through data path. In a pass-through mode, the keypress entry interface is disabled and the pass-through data path is enabled such that untrusted information (for example, video) from an external untrusted source can be driven into the integrated circuit, through the pass-through data path, and out of the secure integrated circuit and to a display. In a trusted mode, the keypress entry interface is enabled and is usable to receive keypress information in a financial transaction. The pass-through data path is, however, disabled so that unauthorized information cannot be driven through the integrated circuit to the display. Signed images previously stored on the integrated circuit can be verified and driven to the display in a secure fashion. The architecture is flexible and allows an external general purpose video decoder to be used to drive the display in the pass-through mode.

22 Claims, 9 Drawing Sheets

ONE-CHIP ARCHITECTURE

FIG. 1
(PRIOR ART)

TWO-CHIP ARCHITECTURE

FIG. 2
(PRIOR ART)

POS TERMINAL

LOAD SIGNED IMAGES

FIG. 5

PASS-THROUGH MODE

FIG. 6

THE CONFIGURABLE DISPLAY INFORMATION INPUT INTERFACE
EMULATES A SELECTABLE ONE OF A PLURALITY OF DISPLAY
INPUT INTERFACES

FIG. 7

TRUSTED MODE

FIG. 8

FIG. 9

TRUSTED DISPLAY BASED ON DISPLAY DEVICE EMULATION

CROSS REFERENCE TO RELATED APPLICATION

The application claims the benefit under 35 U.S.C. §119(e) of Provisional Application Ser. No. 61/337,937, entitled "Trusted Display Based On Display Device Emulation", filed on Feb. 12, 2010, the subject matter of which is incorporated herein by reference.

TECHNICAL FIELD

The present disclosure relates to controlling access to a display.

BACKGROUND INFORMATION

Several different types of electronic devices are usable to receive financial information and to engage in a financial transaction. Examples include Automatic Teller Machines (ATM), a Point-of-Sale (POS) terminals, unattended vending machines and ticket machines. A POS terminal, for example, is an electronic device used for processing sales transactions at a location of sale. A POS terminal typically has a mechanism for electronically reading in financial payment information (for example, a magnetic stripe reader or a smart card reader), a display, a keypad or touchscreen or other mechanism for receiving manually entered information from the user, and a communication mechanism for communicating electronically in a secure fashion with a remote financial institution. In one situation, a customer who wants to make a purchase swipes a credit card or debit card through the magnetic stripe reader on a POS terminal or inserts a smart card into a smart card reader slot on a POS terminal. The POS terminal is located at the point of sale such as in a retail establishment. The POS terminal combines the entered credit card or debit card information or smart card information with information on the amount of the transaction, and this information is sent in encrypted form from the POS terminal to a financial institution. The customer may authorize the transaction by signing a signature capture device or by providing a fingerprint or personal identification number. How the transaction takes place differs depending on the type of transaction, but in all cases sensitive financial information is entered into the POS terminal. This sensitive information in the POS terminal, if it were to fall into the wrong hands, could be used in unauthorized ways such as to steal money and/or merchandise. Great care is therefore expended in designing a POS terminal to ensure that the POS terminal cannot be used for illicit purposes and that the sensitive financial information and encryption keys stored in the POS terminal cannot be extracted by thieves.

One way that a POS terminal can be used to steal financial information is to load rogue software into the POS terminal. This software may be present without the merchant or customer knowing of its existence. In one attack, the rogue software causes an instruction to be displayed on the screen of the POS terminal prompting a customer to enter the customer's personal identification number (PIN). If the customer complies, then the rogue software receives the PIN from the keypad interface. The customer may not realize that the PIN has been stolen, and in some attacks the customer is able to conclude the intended transaction. Information presented to the user on the screen during the time the POS terminal is processing a transaction must therefore be trusted or must come from a trusted source.

Complicating this issue is the fact that displays on POS terminals are an increasingly valuable resource. Larger and larger displays are being used. Color Liquid Crystal Displays (LCDs) capable of displaying video are sometimes used. Accordingly, it may be desired to use this large color display for uses other than just the secure POS terminal financial transaction application. In one example, a display is usable in combination with a POS terminal to carry out financial sales transactions as described above. At other times, however, the same display is usable as part of a cash register. When being used as part of the cash register, the display is used to display a price or other transaction information to a customer. Alternatively, or in addition, advertising information may be displayed on the display. It is therefore desired that a third party (for example, an advertiser or the merchant) be allowed to display information on the display of the terminal without the display of that information causing a security risk.

Two architectures may be employed to realize a POS terminal that can display third party images and messages on a display: 1) a one-chip architecture, and 2) a two-chip architecture.

Figure 1:
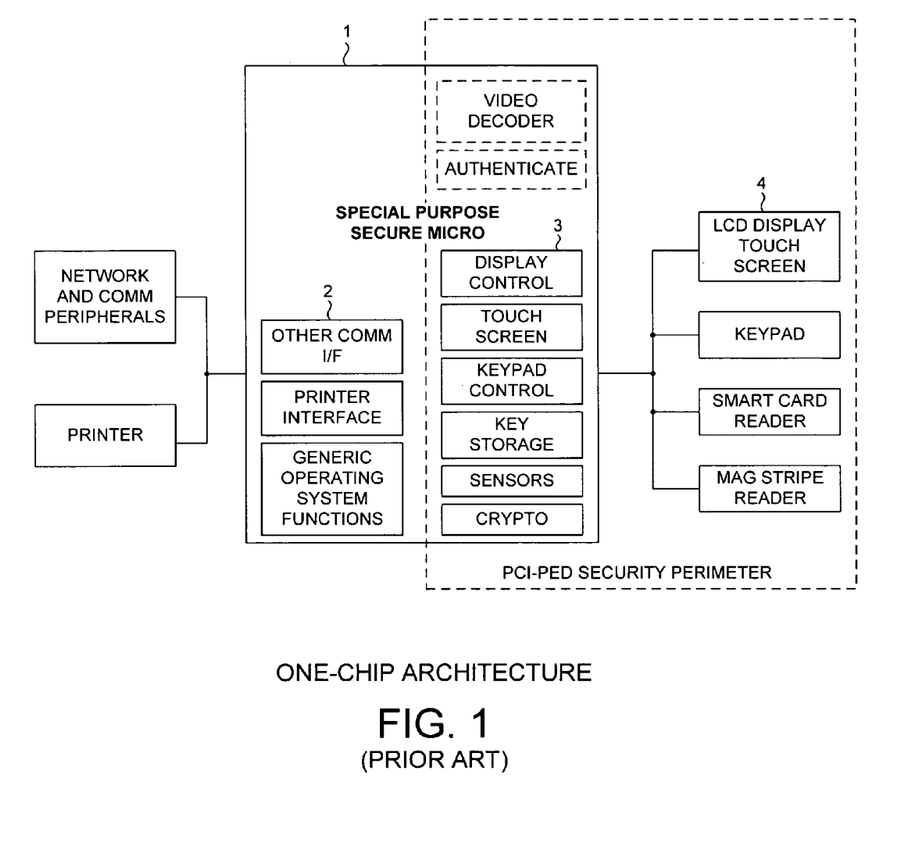
FIG. 1 (Prior Art) is a block diagram of a one-chip POS terminal architecture.

FIG. 1 (Prior Art) is a diagram that illustrates the one-chip architecture. A single microcontroller 1 handles both security functions (such as encryption key storage, PIN management, display control, keypad management) and also handles network communication and non-critical functions, such as printer management. The integrated circuit receives information via communication interface 2 from another source such as from an advertiser or a cash register functionality. The integrated circuit checks every image or frame of the incoming information to confirm authenticity, and only if an image or frame is authenticated does the integrated circuit output it via display control functionality 3 to the display 4. The semiconductor fabrication processes required to realize such a secure microcontroller are generally compatible with making security circuitry and FLASH memory, but these semiconductor processes are generally not compatible with making state-of-the-art high performance Central Processing Units (CPU), high-performance video decoders, or high-performance authentication circuitry. Accordingly, if the one-chip architecture is used in a low-cost application, then the microcontroller (that needs to handle security functions) does not generally have enough performance to decode and decompress, authenticate, and display high resolution video at a high frame rate.

Figure 2:
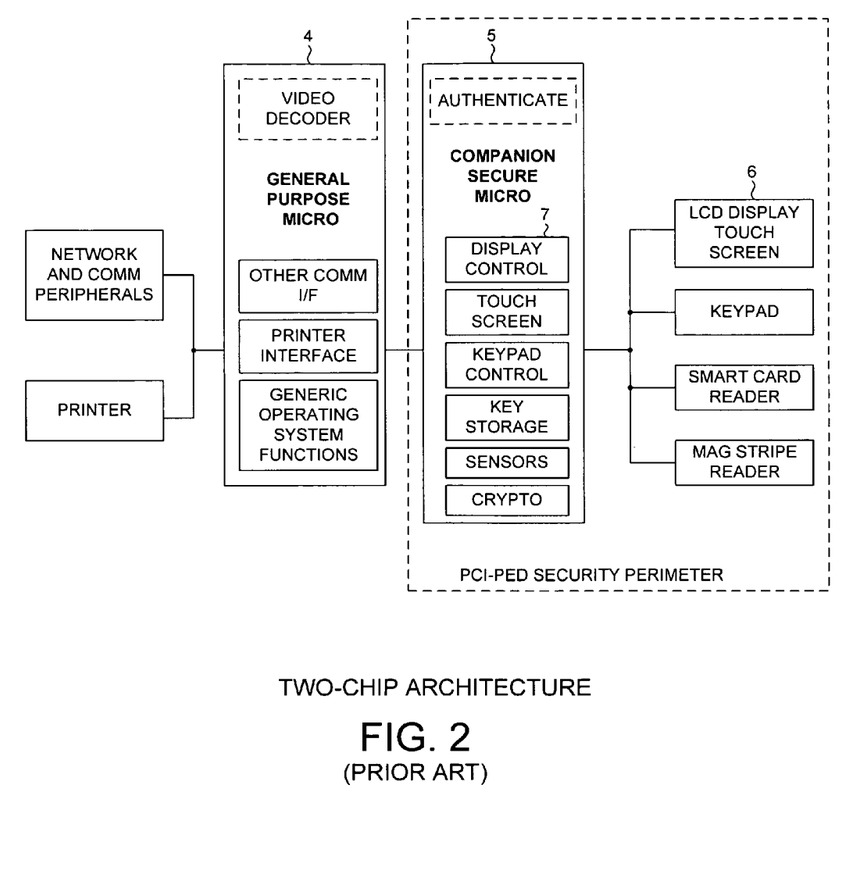
FIG. 2 (Prior Art) is a block diagram of a two-chip POS terminal architecture.

FIG. 2 (Prior Art) is a diagram that illustrates the two-chip architecture. This approach splits the terminal into two portions: a non-secure portion and a secure portion. The non-secure portion is realized using an often expensive, complex, mass-produced, high-performance, general purpose microcontroller 4. Microcontroller 4 can be realized using semiconductor fabrication processes that lend themselves to making high performance Central Processing Units (CPU), high-performance video decoders, and high-performance authentication circuitry. The video could be authenticated statically, but this is too demanding even for the most powerful processors. This microcontroller is used to handle all non-security related functions such as network management, battery charging and monitoring, dialup modem control, printer management. The two-chip architecture allows the POS terminal manufacturer to select from among many general purpose microcontrollers available on the market. The choice of the non-secure microcontroller can be tailored depending on the targeted market and overall networking capabilities. The processing capability of the secure microcontroller does not need to scale with the complexity of the POS/ATM whereas the processing capability of the general purpose microcontroller does.

The secure portion of the two-chip architecture is realized using a relatively low-cost, smaller, and lower-volume microcontroller integrated circuit 5. Security functions include secure key storage, keypad management, LCD control, smart card control, and magnetic stripe reader circuitry. This low-cost microcontroller is realized using a semiconductor fabrication process more suitable for realizing security circuitry and FLASH memory.

Unfortunately, a decoded video stream that is decoded on the non-secure general purpose microcontroller 4 still passes through the secure microcontroller 5 on its way to the display. The secure microcontroller 5 should verify each image or frame before it is forwarded on to the display 6 via a display controller 7. This authentication also can take considerable processing power, especially in the situation of high resolution video. For performance reasons, the checking of each image or frame of decoded video on a low-cost implementation of the two-chip architecture is generally not possible.

SUMMARY

A secure integrated circuit has a keypress entry interface and a pass-through data path. In a first mode, the keypress entry interface is disabled and the pass-through data path is enabled such that untrusted information (for example, video) from an external untrusted source can be driven into the secure integrated circuit, through the pass-through data path, and out of the secure integrated circuit and to a display. The untrusted source can essentially drive the display through the secure integrated circuit. The input of the pass-through data path appears from the outside of the secure integrated circuit as the display. In this sense, the input of the pass-though data path of the secure integrated circuit emulates the input of the display. In this first mode, the keypress entry interface of the integrated circuit is disabled and cannot be used to receive keypress information. The keypress entry interface cannot, for example, be used to receive a PIN number entered by a user of a POS terminal that includes the integrated circuit and the display.

In a second mode, the keypress entry interface is enabled and is usable to receive keypress information onto the secure integrated circuit from a keypad. The pass-though data path is, however, disabled in that information cannot pass from the unauthorized source, through the pass-though data path, and to the display. In one example, previously loaded images for use in a financial transaction are stored in the secure integrated circuit along with corresponding digital cryptographic signatures. Encryption keys are stored in a secure fashion in non-volatile memory within the secure integrated circuit. In the second mode, the encryption keys are used to verify the digital signature of each image. A display controller within the integrated circuit then drives the display such that the verified and authenticated images are displayed on the display. These verified images may, for example, prompt a user through various steps of carrying out a financial transaction. The same output interface of the secure integrated circuit is used to drive the display regardless of whether the information is untrusted information being displayed in the first mode or whether the information is verified and authenticated images being displayed in the second mode. In addition to such images being authenticated and output in the second mode, the second integrated circuit may also generate additional images locally and output those images without the locally-generated images being authenticated using any digital signature.

In a POS terminal application, the secure integrated circuit can be used in the second mode to receive a PIN number from a user via the keypad interface. During this time, unauthorized prompts from an unauthorized source cannot be driven through the pass-through data path of the integrated circuit and to the display because the pass-through data path is disabled. On the other hand, when the POS terminal is not being used to carry out a financial transaction, then the secure integrated circuit operates in the first mode such that the display is freely usable to display untrusted information. In situations where the display is a high resolution color display with a touchscreen capability located in a well-trafficked area, the display may be a valuable resource for advertising or other uses. Better use of the provided resource of the display is afforded. In a two-chip POS terminal architecture, a general purpose microcontroller having a relatively powerful video decoding capability can decode video and then drive the video through the pass-through data path of the secure integrated circuit to the display. Video can be displayed on the display without the secure integrated circuit having to include video decoding capabilities. The architecture of the secure integrated circuit is flexible in that the same secure integrated circuit design is usable in both low-cost POS terminal applications where video is not to be displayed on the display as well as in higher-cost POS terminal applications where video is to be displayed of the display.

The mechanism and method involving the first mode (the pass-through mode) and the second mode (the trusted mode) are not limited to use in POS terminals but rather have general applicability and can be used to control the data path to any display. The trusted mode need not involve a financial transaction.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 3:
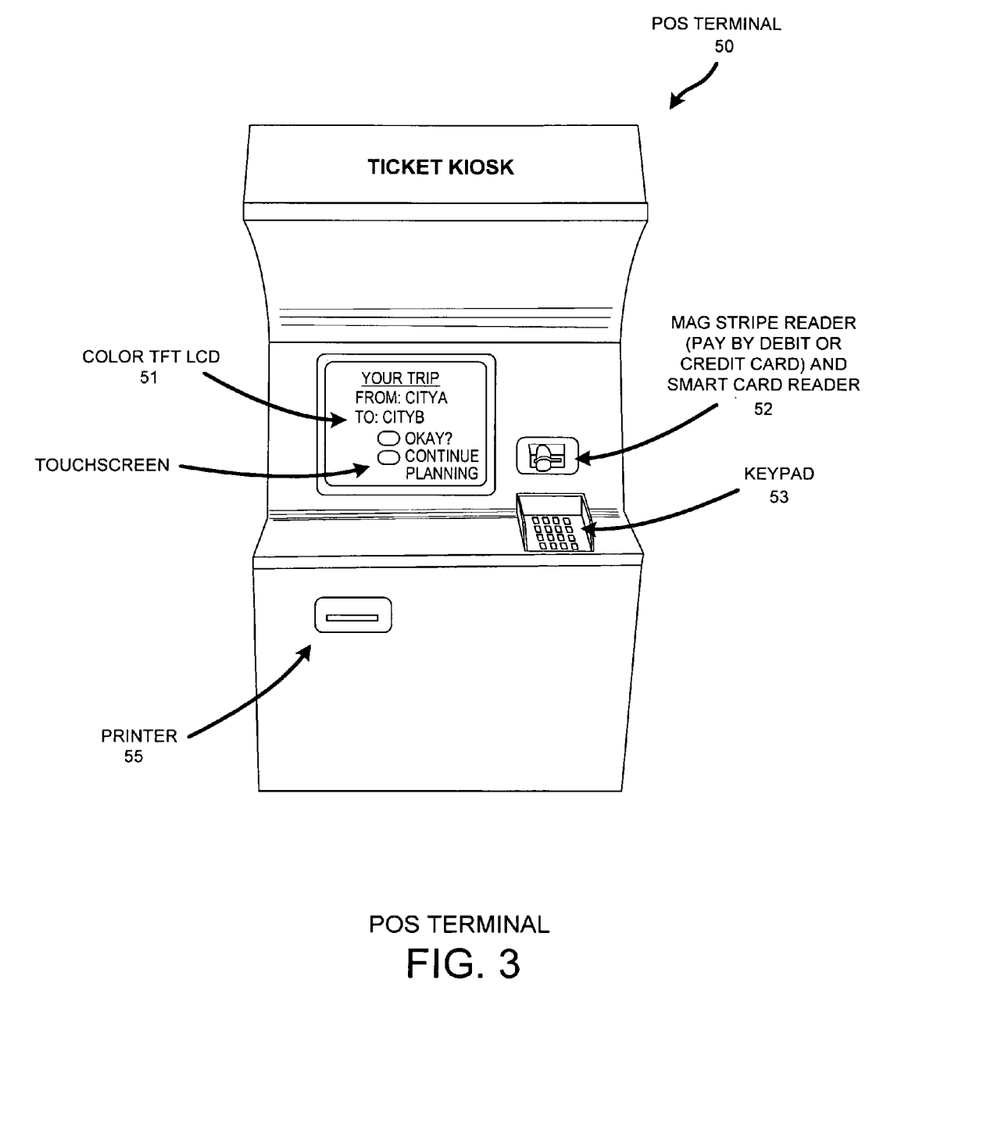
FIG. 3 is a view of the front of a POS terminal in accordance with one novel aspect.

FIG. 3 is a diagram of a POS terminal 50. In the case of FIG. 3, POS terminal 50 is, or is part of, an unattended train station kiosk that a person can use to plan a train trip and to purchase train tickets. POS terminal 50 includes a touchscreen color TFT (Thin Film Transistor) display 51, a magnetic stripe reader and smart card reader 52, a mechanical numerical keypad 53, and a printer 55. In one use scenario, the person views video and/or still images on the display 51 and thereby obtains schedules and prices, and learns about offerings available on the train and elsewhere, and plans a train route. The user interacts with the POS terminal using the touchscreen of display 51 so that information of interest is presented to the user. The user generally concludes this interactive viewing session by selecting a ticket to be purchased. The user then pays for the ticket using the POS terminal. In one example, the user swipes a credit card or debit card through reader 52, or enters a smart card into reader 52. Reader 52 contains electronics for reading both magnetic strip cards as well as smart cards. The user is prompted through the financial transaction process by prompts displayed on display 51. In particular, a prompt is displayed that instructs the user to enter a PIN or to otherwise to verify the upcoming transaction. In response, the user enters a Personal Identification Number (PIN) via secure keypad 53. Although there is a touchscreen, the only way to enter the PIN is through the secure keypad 53.

There are several different ways the financial transaction can be conducted, but in each case sensitive financial information is entered into the POS terminal. The POS terminal then typically communicates by a secure network communication with a financial institution to complete the transaction. Encryption keys stored on the POS terminal are used to encrypt and decrypt these network transactions so that the network communications are secure. The network communications typically occur via a hardwired network connection indicated in FIG. 4 by reference numeral 56. As explained in the background section above, the sensitive financial information entered into the POS terminal and the encryption keys stored on the POS terminal cannot be allowed to fall into the hands of thieves. Once the financial transaction is concluded, POS terminal 50 typically prints a ticket for the person using printer 55. POS terminal 50 may also print a receipt or provide other printed materials to the person.

Figure 4:
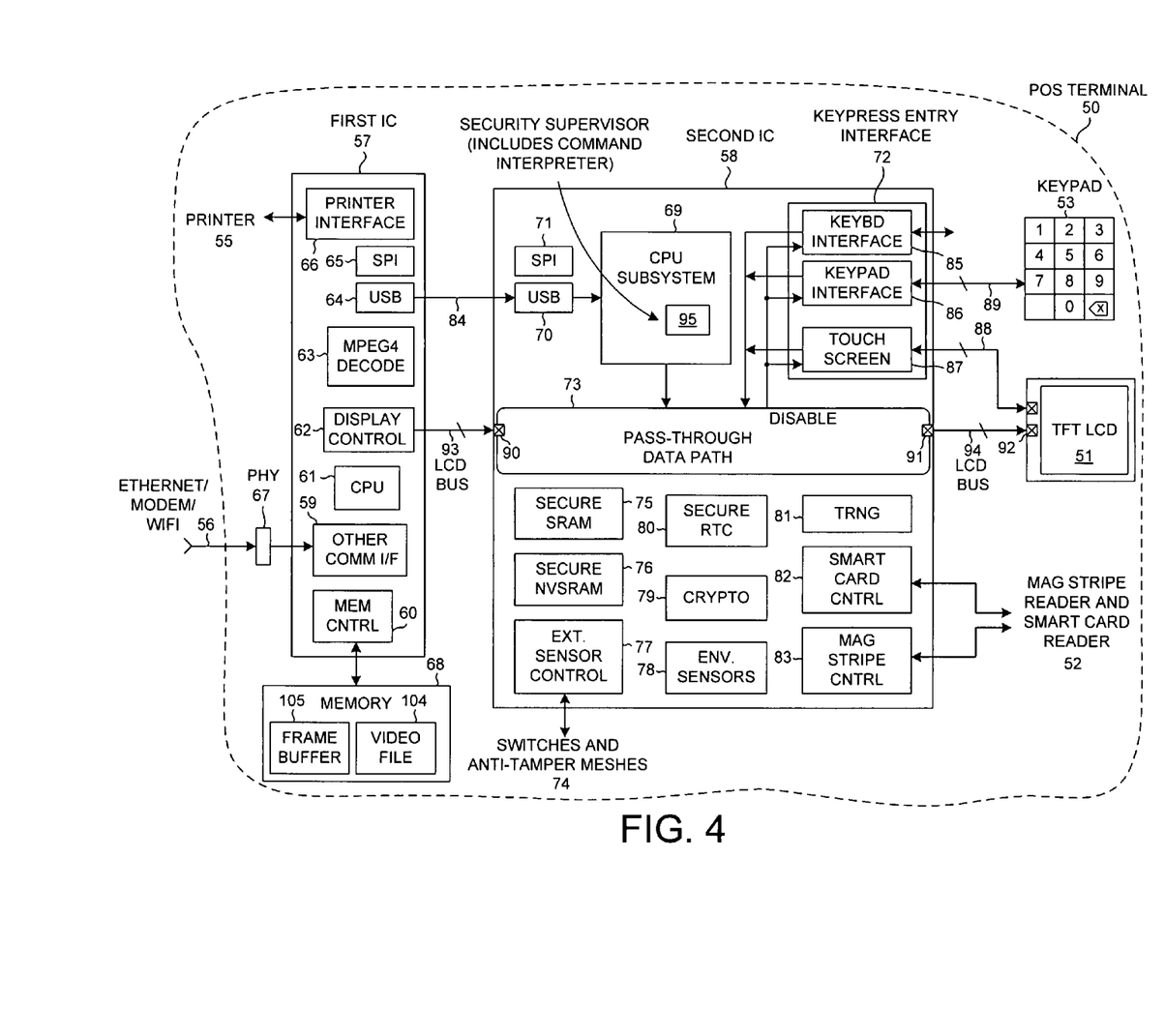
FIG. 4 is a block diagram of the POS terminal of FIG. 3.

FIG. 4 is a more detailed diagram of POS terminal 50. In addition to keypad 53, display 51, magnetic stripe/smart card reader 52, and printer 55 described above, the POS terminal 50 includes a first integrated circuit 57 and a second integrated circuit 58 and anti-tamper switches and anti-tamper meshes 74. First integrated circuit 57 includes a network communication interface 59, a memory controller 60, a Central Processing Unit (CPU) 61, a display controller 62, a video decoder 63, a Universal Serial Bus (USB) bus interface 64, a Serial Peripheral Interface (SPI) bus interface 65, and a printer interface 66. Network communications are communicated into and out of integrated circuit 57 via a physical layer circuitry 67, and communication interface 59. Memory controller 60 reads from, and writes to, external memory integrated circuit 68. First integrated circuit in this particular example is a general purpose, relatively-complex, mass-produced, microcontroller that has substantial processing power.

Second integrated circuit 58, in comparison, is a relatively small, special-purpose, microcontroller that has substantial anti-tamper capabilities and features. Second integrated circuit 58 has processing capabilities, but these are not as substantial as the processing capabilities of the first integrated circuit 57.

Second integrated circuit 58 includes, among other parts not illustrated, a CPU subsystem 69, a USB bus interface 70, an SPI bus interface 71, a keypress entry interface 72, a pass-through data path 73, a secure Static Random Access Memory (SRAM) 75, a secure Non-Volatile SRAM (NVSRAM) 76, external anti-tamper sensor control circuitry 77, environmental sensors 78, a cryptographic circuit block 79, a secure Real Time Clock (RTC) 80, a hardware True Random Number Generator (TRNG) 81, a smart card controller 82, and a magnetic stripe reader control circuit 83. Secure SRAM is used to store credit card numbers, bank account information, and PIN numbers and other sensitive financial information entered in the POS terminal during a financial transaction. Secure NVSRAM is used to store encryption keys usable to engage in secure network communications (for example, with a bank or other financial institution). The first and second integrated circuits 57 and 58 intercommunicate with one another via USB bus 84 and USB interfaces 64 and 70. Second integrated circuit 58 receives information to be displayed on display 51 from the first integrated circuit 57 via LCD bus 93.

Keypress interface 72 is the mechanism by which user keypress information can be entered into second integrated circuit 58 in a financial transaction. Keypress interface 72 includes a keyboard interface 85, a keypad interface 86, and a touchscreen interface 87. In the illustrated example, display 51 is a touchscreen display. The touchscreen interface 87 is therefore coupled to touchscreen terminals on the display 51 via connections 88 so that touchscreen interface 87 can drive signals out to the touchscreen portion of the display and can read information back from the touchscreen portion of the display. The keypad interface 86 is connected to keypad 53 by connections 89. Keypad interface may, for example, perform a special form of secure randomized keyscanning whereby keypad interface 86 detects when a key on keypad 53 is pressed and detects which particular key it was that was pressed. In the event information is to be entered via a remote keyboard, then keyboard interface 85 is connected to that remote keyboard. The keyboard interface 85 may, for example, communicate with such an external keyboard by a standard serial bus protocol used to connect keyboards to personal computers. Each of the interfaces 85, 86 and 87 is configurable under software control so that it can be made to interface to a selected one several external devices and protocols.

POS terminal 50 is operable in one of two modes. In the first mode, the keypress entry interface 72 is disabled such that key press information from keypad 53 cannot be read back into second integrated circuit 58. The pass-though data path 73 causes a data path to extend from input terminals 90 of pass-through data path 73, through the pass-through data path 73, and to output terminals 91 of the pass-through data path 73. In this mode, display controller 62 of first integrated circuit 57 drives terminals 90 in the same way as if it were driving terminals 92 of display 51. The interface that display controller 62 sees looking into second integrated circuit 58 looks the same as the interface looking into display 51. The input interface involving terminals 90 of the pass-through data path 73 is said to emulate the input interface of display 51. Signals that display controller 62 drives via LCD bus 93 onto the input terminals 90 of pass-through data path 73 pass through the pass-through data path 73 substantially unchanged (they are buffered) and exit out the output of pass-through data path 73 via output terminals 91, and are conducted via LCD bus 94 to the input interface of display 51. In this first mode, a device (for example, display controller 62) can control display 51 through second integrated circuit 58, but during this time the keypress entry interface 72 (including the keypad interface 86) is disabled such that keypress information cannot be entered into the second integrated circuit 58. If rogue software were somehow to cause a prompt to be displayed to the user to enter a PIN, for example, it would be impossible for use to enter the PIN because the keypress entry interface 72 would be disabled. The circuitry is hardwired such that if pass-though data path 73 is enabled, then the keypress entry interface 72 is disabled.

In the second mode, keypress entry interface 72 is enabled but the pass-through data path 73 is disabled in the sense that information received onto input terminals 90 cannot pass through the data path 73 to the output terminals 91 and to display 51. In this mode, keypress information from keypad 53 can be entered into second integrated circuit 58 via keypad interface 86, but in this mode the information driven onto output terminals 91 for presentation to display 51 is controlled by, and is verified and authenticated by, second integrated circuit 58 as will be explained in further detail below. At a time when a user may successfully enter a PIN due to keypad interface 86 being enabled it is impossible for a source of unauthorized video or graphics to drive display 51 and to cause a false prompt to be displayed to the user.

Figure 5:
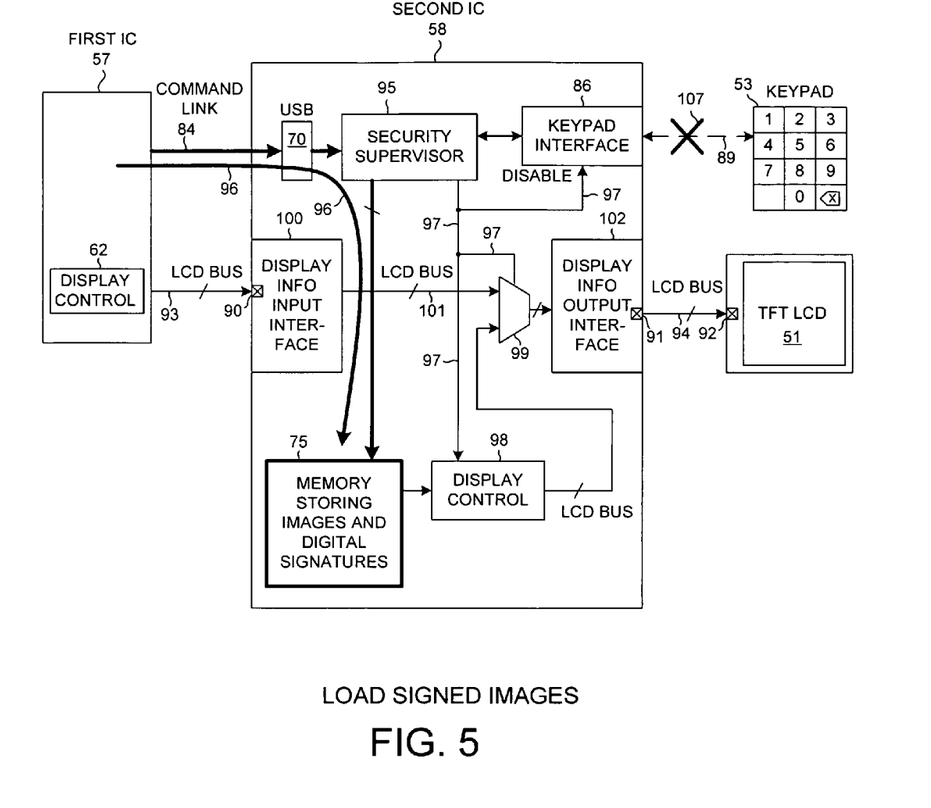
FIG. 5 is a simplified diagram that illustrates how images and corresponding digital signatures are loaded into the POS terminal of FIG. 4.

FIG. 5 is a simplified diagram of an initialization step in operation of POS terminal 50 of FIG. 4. Many of the components and connections of FIG. 4 are not shown in FIG. 5 in order to facilitate showing more detail regarding the pass-through data path in FIG. 5. Information to be displayed on display 51 in the second mode is loaded into secure SRAM 75. This information can be video, still images, bitmaps, icons, and/or other graphic or textual information, in either compressed or uncompressed form. In the illustrated example, the information involves a set of bitmap images, and for each image a digital signature is also loaded. Arrow 96 illustrates this loading. The images and corresponding digital signatures are loaded from first integrated circuit 57, via USB bus 84, via USB bus interface 70, via a security supervisor portion 95 of CPU subsystem 69, and to secure SRAM 75. During this time, security supervisor 95 disables the keypress entry interface 72 (including the keypad interface 86) by a DISABLE signal on conductor 97. The disabling of the keypad interface 86 is indicated by the cross symbol 107 in FIG. 5. The DISABLE signal on conductor 97 also disables a display controller 98 of the pass-through data path 73. The DISABLE signal on conductor 97 also selects multiplexer 99 such that information from LCD bus 93 can pass through display information input interface 100, across conductors 101, through multiplexer 99, through display information output interface 102, and across LCD bus 94, to display 51.

Figure 6:
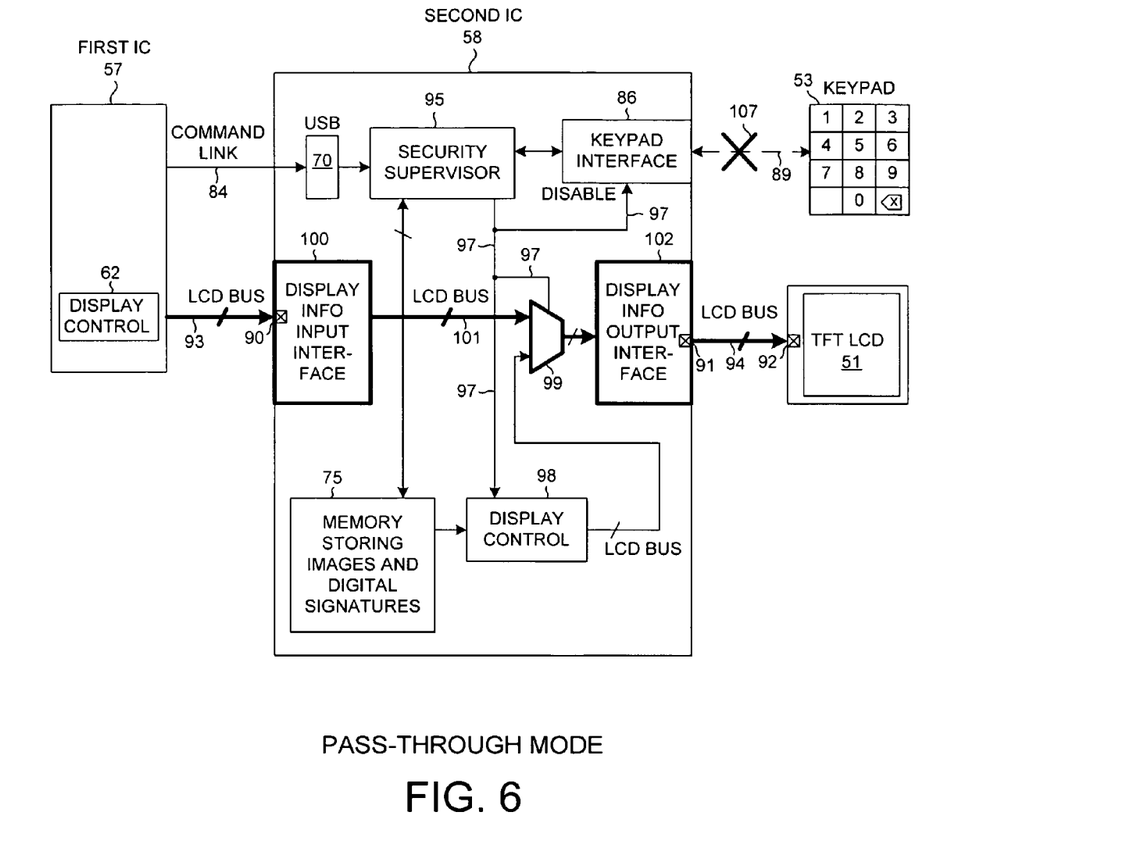
FIG. 6 is a simplified diagram that illustrates the operation of the POS terminal in the pass-through mode.

FIG. 6 is a diagram of operation in the first mode (the pass-through mode). Security supervisor 95 asserts the DISABLE signal on conductor 97 such that keypad interface 86 is disabled, such that display controller 98 is disabled, and such that the pass-though data path 73 is enabled. The display information input interface 100, the internal LCD bus 101, the multiplexer 99, the display controller 98, as well as other circuitry not illustrated, are parts of the pass-through data path 73. In this first mode, the display controller 62 in first integrated circuit 57 can drive untrusted information to display 51 through the enabled pass-through data path 73 of second integrated circuit 58. The untrusted information passes across LCD bus 93, through input terminals 90, through display information input interface 100, across conductors 101, through multiplexer 99, through display information output interface 102, through output terminals 91, and across LCD bus 94, to display 51. Untrusted video or images or other information can be displayed on display 51 by first integrated circuit 57, but during this time a user cannot enter a PIN number into the POS terminal because keypad interface 86 of the second integrated circuit 58 is disabled.

Figure 7:
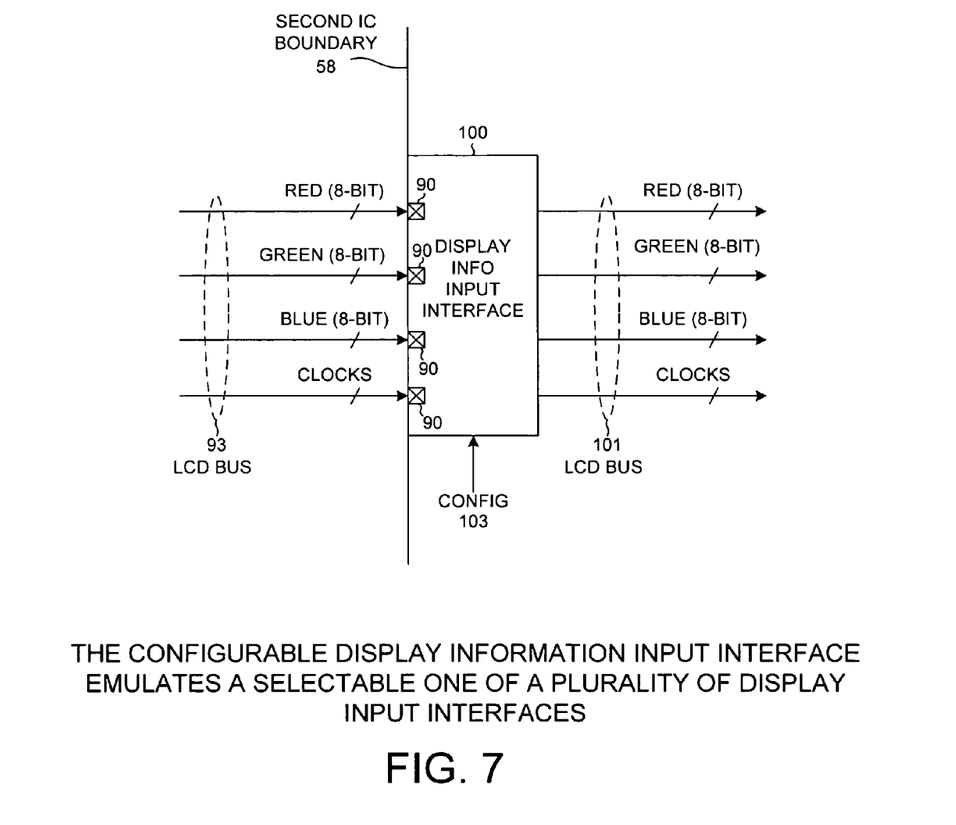
FIG. 7 is a diagram of the configurable a display input interface of a pass-through data path of the second integrated circuit of the POS terminal.

FIG. 7 is a more detailed diagram that shows the input terminals 90 of the display information input interface 100 of the pass-through data path 73. In this example, the display 51 has an input interface involving eight terminals for receiving an 8-bit red pixel value, eight terminals for receiving an 8-bit green pixel value, eight terminals for receiving an 8-bit blue pixel value, and terminals for receiving clock and control signals. Accordingly, the display information input interface 100 is configured by configuration information 103 so that display information input interface mimics the input interface of the display. There is a one-to-one correspondence in structure and function between the various terminals 90 of the display input interface 100 and various terminals of the input interface of display 51. Display information input interface 100 is configurable, under control of software executing on CPU subsystem 69, so that display information input interface 100 can be made to emulate a selected one of a plurality of different display input interfaces.

Figure 8:
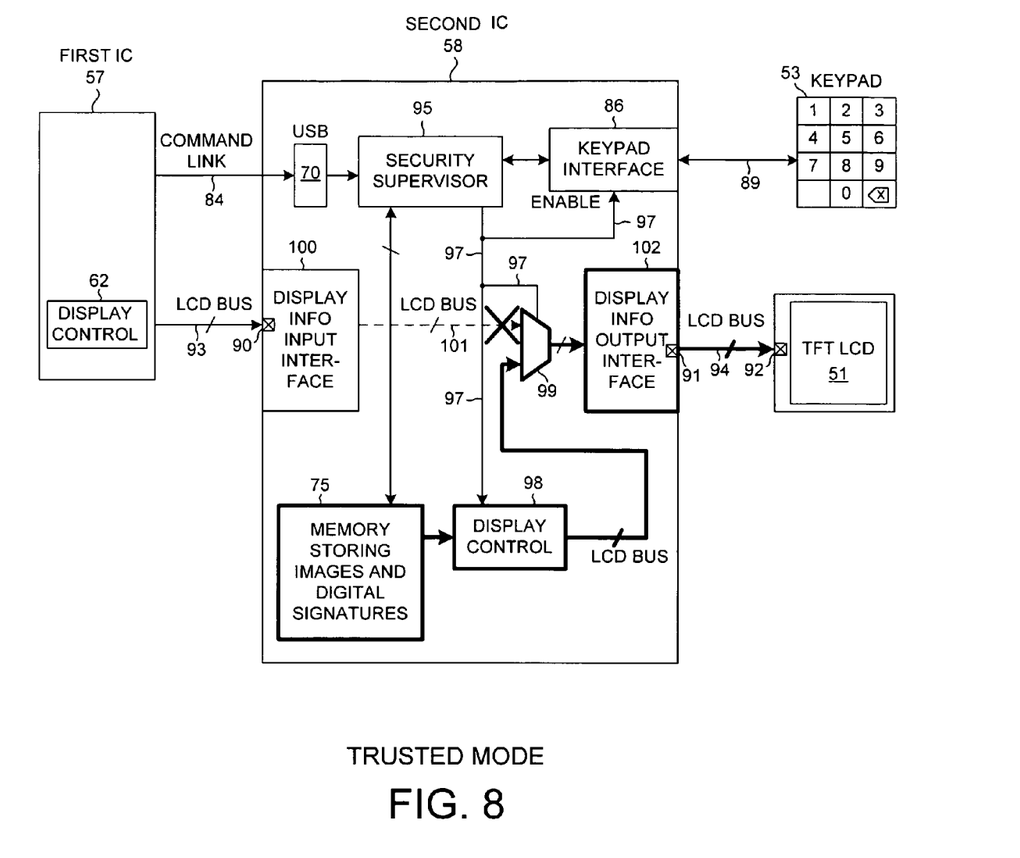
FIG. 8 is a simplified diagram that illustrates operation of the POS terminal in the trusted mode.

FIG. 8 is a diagram of operation in the second mode (the trusted mode). Security supervisor 95 disables the pass-through data path 73 such that information cannot pass from the input terminals 90 of display information input interface 100, through second integrated circuit 58, out of display information output interface 102, and to display 51. Security supervisor 95 uses an encryption key stored in secure NVSRAM 76 to check an image with its corresponding digital signature. If the digital signature is correct, then display controller 98 reads the image, and drives the LCD 51 via multiplexer 99, display information interface 102, and LCD bus 94. In this way, display controller 98 can cause verified images to be displayed on display 51, but untrusted information from display information input interface 100 is prevented from passing through the pass-through data path 73. In the second mode, security supervisor 95 via conductor 97 also enables keypress entry interface 72 (including keypad interface 86) such that user keypress information from keypad 53 can be entered into second integrated circuit 58. Whereas the first mode is used when untrusted information such as video and images on train routes and schedules and advertisements are driven through the second integrated circuit and to display 51 in the first mode, the second mode is used when a financial transaction is to be performed. In the second mode (trusted mode), additional locally-generated images and information that might be generated on the second integrated circuit 58 can also be output onto output terminals 91 without these additional locally-generated images and information being authenticated (for example, be using a digital signature) prior to their being output.

Figure 9:
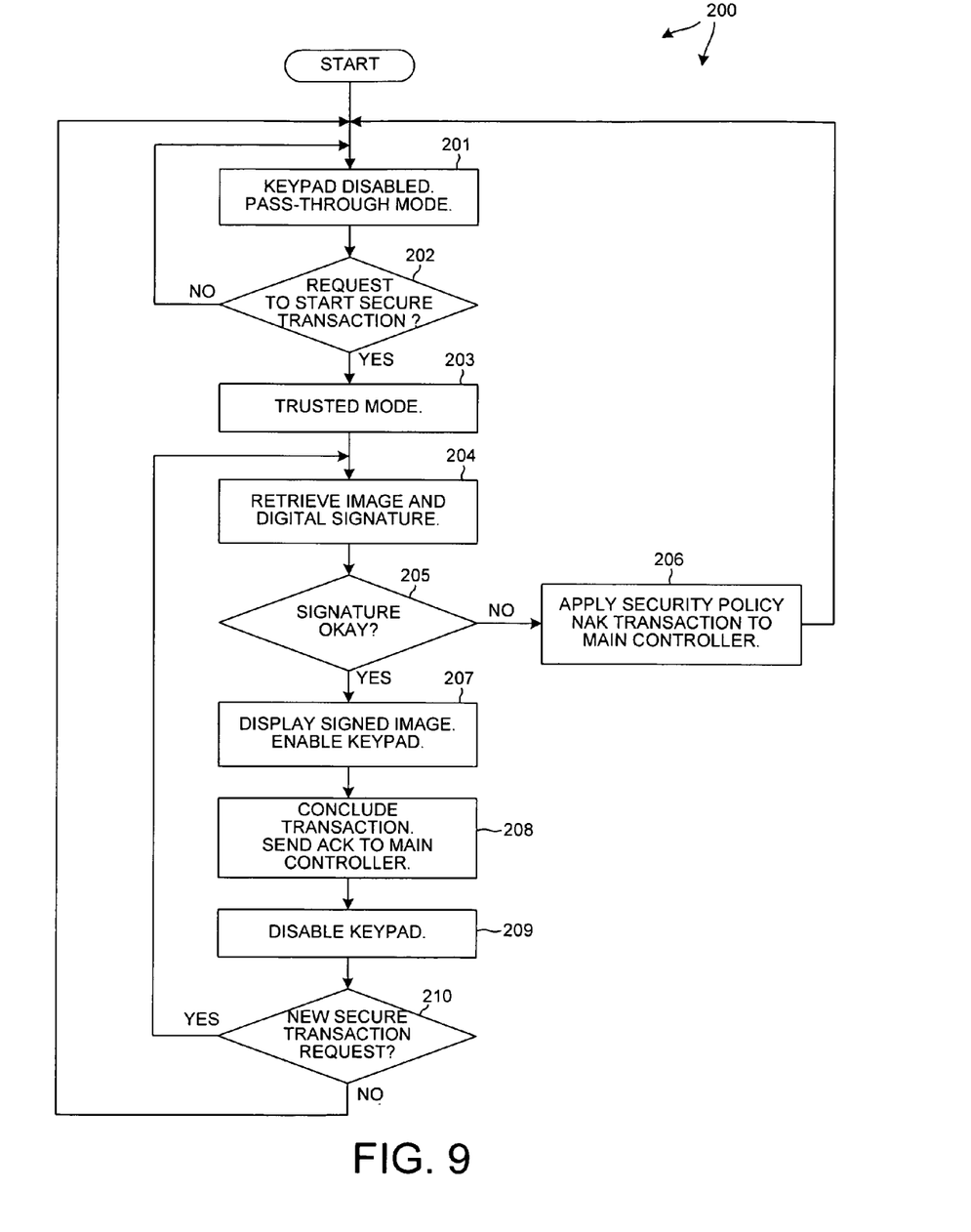
FIG. 9 is a flowchart that illustrates a method of operating the POS terminal.

FIG. 9 is a flowchart of a method 200 of operating POS terminal 50. Initially, the keypad interface is disabled and the second integrated circuit is made to operate (step 201) in the first mode (the pass-through mode). In one example, streaming video may be received via network interface 59 and may be stored in a video file portion 104. The video then read out is decompressed and decoded by MPEG4 video decoder 63, and the resulting frames are stored in frame buffer 105. The frames are then read out of frame buffer 105 one by one and are supplied to display controller 62. Display controller 62 causes the images to be displayed by driving signals onto the input terminals 90 of the second integrated circuit 58 as if display controller 62 were driving display 51 directly. Due to the pass-through mode operation, the information passes through the second integrated circuit 58, and is supplied onto the input interface of display 51. In this way, video or other information from a network can be streamed into, or be otherwise be loaded into, the POS terminal 50 and can be displayed on display 51. A video decoder of a relatively powerful, general purpose microcontroller is used to drive the display. The images displayed are said to be untrusted because they are not verified by the second integrated circuit 58. The keypad is disabled during the time display 51 is open to display untrusted content.

Second integrated circuit 58 remains in this mode until the second integrated circuit receives a request to start a secure transaction. The request is received from first integrated circuit 57 via USB bus 84. The request is interpreted by a command interpreter portion of the CPU subsystem 89. When the second integrated circuit 58 determines that such a command has been received, then the second integrated circuit starts operating in the second mode (the trusted mode) in step 203. An image and its corresponding digital signature is retrieved (step 204) from memory 75. Encryption keys stored in secure NVSRAM are used to check the digital signature. If the signature is not verified, then a security policy is applied (for example, an alarm is sounded) and a negative acknowledge (NAK) is returned (step 206) to the first integrated circuit 57 via USB bus 84. If the digital signature is verified (step 205), then display controller 98 drives the input interface of display 51 via multiplexer 99, display information output interface 102, and LCD bus 94 so that the signed image is displayed (step 207). The keypad interface 86 is enabled (step 207). In this mode, various verified images may be displayed, and the financial transaction is carried out. When the financial transaction is concluded, then secure supervisor 95 sends an acknowledgment (ACK) back to the first integrated circuit 57 via USB bus 84 (step 208). The keypad interface 86 is disabled (step 209). If a second request for a secure transaction is received via USB bus 84 (step 210), then processing returns to step 204. The second integrated circuit 58 continues to operate in the trusted mode. If, however, there is no new request for a secure transaction (step 210), then processing returns to step 201. The keypad interface is disabled and the second integrated circuit is made to operate in the pass-through mode so display 51 can again be used to display untrusted content.

Although certain specific embodiments are described above for instructional purposes, the teachings of this patent document have general applicability and are not limited to the specific embodiments described above. A POS terminal application is described above, but the mechanism and method involving a pass-through mode and a trusted mode are not limited to use in POS terminals but rather have general applicability and can be used in the data path to any display. The trusted mode need not involve a financial transaction. The mechanism and trusted mode can restrict access to a display for other purposes in other non-financial transaction applications in a wide variety of electronic consumer devices. Accordingly, various modifications, adaptations, and combinations of various features of the described embodiments can be practiced without departing from the scope of the invention as set forth in the claims.

What is claimed is:

1. A method comprising:
   (a) in a first mode disabling a keypress entry interface of an integrated circuit and enabling a pass-through data path, wherein the pass-through data path extends from a display information input interface of the integrated circuit and passes through the integrated circuit and to a display information output interface of the integrated circuit, wherein untrusted information is displayed and wherein untrusted information is received from an unauthorized source; and
   (b) in a second mode enabling the keypress entry interface and disabling the pass-through data path such that information received onto the display information input interface cannot pass through the pass-through data path to the display information output interface, wherein trusted information is displayed and wherein trusted information is received from an authorized source, and wherein the first and second modes are two modes of operation of the integrated circuit.

2. The method of claim 1, wherein the keypress entry interface is taken from the group consisting of: a keypad interface, a keyboard interface, and a touchscreen interface.

3. The method of claim 1, wherein the pass-through data path is adapted to communicate information from the display information input interface to the display information output interface, and wherein the information is taken from the group consisting of: a bitmap image, video information, textual information, compressed image information, and compressed video information.

4. The method of claim 3, further comprising:
   (c) generating an image on the integrated circuit and outputting the image onto the display information output interface in the second mode without using any digital signature to authenticate the image.

5. The method of claim 3, further comprising:
   (c) receiving an image and an associated digital signature onto the integrated circuit, and wherein in the second mode in (b) the image is authenticated by the integrated circuit using the digital signature and the authenticated image is output onto the display information output interface.

6. The method of claim 5, wherein the integrated circuit generates a second image locally and outputs the second image onto the display information output interface in the second mode without using any digital signature to authenticate the second image.

7. The method of claim 1, wherein the display information output interface of the integrated circuit is coupled to an input interface of a display, wherein the display information input interface of the integrated circuit is substantially functionally identical to the input interface of the display.

8. The method of claim 1, further comprising:
   (c) receiving a command onto the integrated circuit, wherein the command causes the integrated circuit to switch from operating in the first mode to operating in the second mode.

9. The method of claim 1, wherein the display information input interface includes a first group of terminals for receiving red pixel information, a second group of terminals for receiving green pixel information, and a third group of terminals for receiving blue pixel information.

10. The method of claim 1, wherein the display information input interface is configurable to emulate a selectable one of a plurality of display input interfaces.

11. The method of claim 1, further comprising:
    (c) in the second mode using the display information output interface to communicate information to a display such that the information is displayed on the display, wherein the information displayed prompts a user to enter key press information into a keypress capture device, and receiving the key press information from the keypress capture device onto the keypress entry interface.

12. The method of claim 1, wherein the keypress entry interface can be disabled during a portion of time that the integrated circuit is operating in the second mode, but wherein the keypress entry interface cannot be enabled during any portion of time that the integrated circuit is operating in the first mode.

13. The method of claim 1, further comprising:
(c) receiving financial information onto the integrated circuit, wherein the financial information is taken from the group consisting of: a credit card number, a bank account number, a personal identification number, a transaction amount, an encryption key, fingerprint information.

14. An integrated circuit comprising:
a keypress entry interface;
a display information input interface;
a display information output interface; and
a control circuit that in a first mode disables the keypress entry interface and causes a pass-through data path to extend from the display information input interface to the display information output interface, and that in a second mode enables the keypress entry interface and disables the pass-through data path such that such that information received onto the display information input interface cannot pass through the pass-through data path to the display information output interface, wherein in the first mode, untrusted information is displayed and in the second mode, trusted information is displayed, wherein untrusted information is received from an unauthorized source and wherein trusted information is received from an authorized source.

15. The integrated circuit of claim 14, wherein the display information input interface is configurable to emulate a selectable one of a plurality of display input interfaces.

16. The integrated circuit of claim 14, wherein the pass-through data path is adapted to communicate information from the display information input interface to the display information output interface, and wherein the information is taken from the group consisting of: a bitmap image, video information, textual information, compressed image information, and compressed video information.

17. The integrated circuit of claim 14, wherein the display information input interface includes a first group of terminals for receiving red pixel information, a second group of terminals for receiving green pixel information, and a third group of terminals for receiving blue pixel information.

18. The integrated circuit of claim 14, further comprising:
a bus interface over which a communication is received onto the integrated circuit, wherein the communication causes the integrated circuit to switch from operating in the first mode to operating in the second mode.

19. The integrated circuit of claim 14, further comprising:
a memory that stores an image and a digital signature associated with the image.

20. An apparatus comprising:
a keypress information entry mechanism;
a display information input interface;
a display information output interface; and
means for, in a first mode, disabling the keypress information entry mechanism and for causing a pass-through data path to extend from the display information input interface, through the apparatus, and to the display information output interface, and for, in a second mode, enabling the keypress information entry mechanism and for disabling the pass-through data path such that such that information received onto the display information input interface cannot pass through the pass-through data path to the display information output interface, wherein in the first mode, untrusted information is displayed and in the second mode, trusted information is displayed, wherein untrusted information is received from an unauthorized source and wherein trusted information is received from an authorized source.

21. The apparatus of claim 20, further comprising:
a memory that stores an image, wherein the means is also for, in the second mode, reading the image out of the memory and authenticating the image and outputting the image from the display information output interface.

22. The apparatus of claim 20, wherein the apparatus is an integrated circuit, wherein information is communicated across the pass-through data path in the first mode from the display information input interface to the display information output interface, and wherein the information is taken from the group consisting of: a bitmap image, video information, textual information, compressed image information, and compressed video information.

* * * * *